(12) United States Patent
Kim (10) Patent No.: US 7,747,163 B2
(45) Date of Patent: Jun. 29, 2010

(54) TESTING MATTER PHOTOGRAPHING APPARATUS ATTACHED THREE DIMENSIONAL IMAGE PHOTOGRAPHING DEVICE

(75) Inventor: Hyun-Kyu Kim, Daejeon (KR)

(73) Assignee: Topins Co., Ltd. (KR)

( * ) Notice: Subject to any disclaimer, the term of this patent is extended or adjusted under 35 U.S.C. 154(b) by 250 days.

(21) Appl. No.: 12/096,003

(22) PCT Filed: Dec. 11, 2006

(86) PCT No.: PCT/KR2006/005388

§ 371 (c)(1),
(2), (4) Date: Jun. 3, 2008

(87) PCT Pub. No.: WO2007/069840

PCT Pub. Date: Jun. 21, 2007

(65) Prior Publication Data

US 2009/0041449 A1 Feb. 12, 2009

(30) Foreign Application Priority Data

Dec. 12, 2005 (KR) .................... 10-2005-0121579

(51) Int. Cl.
G03B 35/00 (2006.01)
H04N 15/00 (2006.01)
H04N 13/00 (2006.01)
(52) U.S. Cl. .................................. 396/324; 348/44
(58) Field of Classification Search ............... 396/324; 348/44; 356/416
See application file for complete search history.

(56) References Cited

U.S. PATENT DOCUMENTS 7,298,415 B2 * 11/2007 Nilson et al. ............. 348/370

(Continued)

FOREIGN PATENT DOCUMENTS

JP        06186035        7/1994

(Continued)

OTHER PUBLICATIONS

International Search Report for corresponding International Appliance No. PCT/KR2006/005388 dated Apr. 2, 2007.

*Primary Examiner*—W. B. Perkey
*Assistant Examiner*—Noam Reisner
(74) *Attorney, Agent, or Firm*—Cantor Colburn LLP (57) ABSTRACT

The present invention relates to an apparatus for photographing an experimental object or animal. The apparatus comprises: a two-dimensional image photographing device which includes a light source, a first optical filter wheel, a first motor, a beam splitter, a second motor, a first window, a second window, an optical zoom module, a second optical filter wheel, a fourth motor, a photographing means and a first enclosure; a three-dimensional image photographing device which includes a laser scanner, a test tube, a third motor, a test tube mounting stand and a second enclosure; and a control section for controlling the operations of the first motor, the second motor, the optical zoom module, the photographing means, the third motor and the fourth motor. The experimental object photographing apparatus includes the three-dimensional experimental object photographing device detachably mounted to the two-dimensional image photographing device so as to obtain two-and three-dimensional images of the experimental object. Since the three-dimensional image photographing device is coupled to the two-dimensional image photographing device only when it is desired to photograph the three-dimensional image, its installation and operation are easy and the two-and three-dimensional image photographing devices do not need to be purchased separately, thereby saving the cost.

7 Claims, 3 Drawing Sheets

U.S. PATENT DOCUMENTS

2001/0003044 A1* 6/2001 Modlin et al. ............... 435/7.1
2002/0009719 A1* 1/2002 Walt et al. .................. 435/6
2008/0031494 A1* 2/2008 Rice et al. .................. 382/110

FOREIGN PATENT DOCUMENTS

| JP | 13280933 | 10/2001 |
| JP | 16240138 | 8/2004 |
| KR | 10-1998-0044511 | 5/2000 |

* cited by examiner

TESTING MATTER PHOTOGRAPHING APPARATUS ATTACHED THREE DIMENSIONAL IMAGE PHOTOGRAPHING DEVICE

TECHNICAL FIELD

The present invention relates to an experimental object photographing apparatus including a three-dimensional image photographing device, and more particularly, to an experimental object photographing apparatus including a three-dimensional image photographing device which can be detachably mounted to a two-dimensional image photographing device to enable a two-dimensional image and a three-dimensional image of an experimental object to be photographed.

BACKGROUND ART

An experimental object photographing apparatus is equipment for photographing images of results produced from various experiments. Conventionally, a device for photographing a two-dimensional image and a device for photographing a three-dimensional image are provided independently to photograph an image of an experimental object.

An example of a conventional prior art relating to an experimental object photographing apparatus includes the Korean Patent Laid-Open Publication No. 1998-044511 entitled "a fracture scene photographing system for testing durability of components" in which a torsion or a bending force is repeatedly applied to a sample several hundred thousand times so as to test durability of the sample while allowing a camera to automatically photograph a fracture scene of the sample while.

However, such a conventional technique is intended to photograph the sample in order to test durability of parts, and entail a problem in that it is impossible to photograph a two-dimensional image or a three-dimensional image of an experimental object or the sample according to a certain wavelength band.

DISCLOSURE

Technical Problem

Accordingly, the present invention has been made to address and solve the above-mentioned problem occurring in the prior art, and it is an object of the present invention to provide an experimental object photographing apparatus including a three-dimensional image photographing device which enables a two-dimensional image and a three-dimensional image of an experimental object to be photographed.

Technical Solution

The present invention is directed to an experimental object photographing apparatus including a three-dimensional image photographing device.

The experimental object photographing apparatus according to the present invention includes the three-dimensional experimental object photographing device detachably mounted to the two-dimensional image photographing device so as to obtain a two-dimensional image and a three-dimensional image of the experimental object.

To accomplish the above object, according to one aspect of the present invention, there is provided an apparatus for photographing an experimental object or an experimental animal, comprising:

a two-dimensional image photographing device 100 which includes a light source 10 for generating light used to photograph the experimental object or the experimental animal, a first optical filter wheel 20 mounted below the light source and having a plurality of first optical filters 25 circumferentially arranged at certain angles for allowing only light of a necessary wavelength among the light generated from the light source to pass therethrough, a first motor 30 mounted at the center of the first optical filter wheel 20 for rotating the first optical filter wheel 20 about a Z axis, a beam splitter 40 mounted below the first optical filter wheel 20 for allowing the light passed through the first optical filters 25 to pass therethrough or to be reflected therefrom at a certain ratio, a second motor 45 mounted at one side end of the beam splitter 40 for rotating the beam splitter 40 about an X axis, a first window 50 mounted below the beam splitter 40 for allowing the light passed through the beam splitter 40 to be transmitted therethrough, a second window 70 mounted at the back of the beam splitter 40 for allowing the light reflected from the beam splitter 40 to be transmitted therethrough, an optical zoom module 80 mounted in front of the beam splitter 40 for magnifying or shrinking an image of the experimental object or the experimental animal 400 passed through the beam splitter 40, a second optical filter wheel 85 mounted in front of the optical zoom module 80 and having a plurality of second optical filters 82 circumferentially arranged at certain angles for allowing only light of a necessary wavelength among the light reflected from the experimental object or the experimental animal 400 to pass therethrough, a fourth motor 87 mounted at the center of the second optical filter wheel 85 for rotating the second optical filter wheel 85 about an Y axis, a photographing means 90 for photographing the magnified or shrinked image of the experimental object or the experimental animal 400 passed through the optical zoom module 80 and the second optical filters 82 of the second optical filter wheel 85, and a first enclosure 99 to which the light source 10, the first optical filter wheel 20, the first motor 30, the beam splitter 40, the second motor 45, the first window 50, the second window 70, the optical zoom module 80, the second optical filter wheel 85, the fourth motor 87 and the photographing means 90 are fixedly mounted, the first enclosure having a first door(95) mounted at a lower portion of one side thereof in such a manner as to be disposed below the first window 50 so as to be openably/closeably moved downwardly/upwardly;

a three-dimensional image photographing device 200 which includes a laser scanner 110 for generating a laser beam to transmit the experimental object or the experimental animal 40, a test tube 120 for allowing light emitted from the laser scanner 110 to transmit therethrough, the test tube having at least one fixing means 125 mounted to the upper portion thereof for fixing the experimental object or the experimental animal, a third motor 130 mounted below the test tube 120 for rotating the test tube 120 about the Z axis, a test tube mounting stand 135 fixedly mounted above the third motor 130 for allowing the test tube 120 to be seated thereon, and a second enclosure 190 to one side of which the laser scanner 110 is mounted, and to which the test tube 120, the third motor 130 and the test tube mounting stand 135 are fixedly mounted internally, the second enclosure being detachably mounted at the other side thereof to the second window 70 of the two-dimensional image photographing device 100 and having a second door 185 openably/closeably mounted at the one side of the second enclosure; and a control section for controlling the operations of the first motor 30, the second motor 45, the optical zoom module 80, the fourth motor 87, the photographing means 90 and the third motor 130.

Also, preferably, the plurality of first optical filter 25 of the first optical filter wheel 20 and the plurality of second optical filter 82 of the second optical filter wheel 85 are circumferentially arranged at 60 degree intervals, respectively, and two of them are replaceable.

In addition, preferably, the two-dimensional image photographing device 100 further includes a first anesthetic gas-generating means 60 mounted below the first window 50 for generating gas to anesthetize the experimental object or the experimental animal.

Moreover, preferably, the three-dimensional image photographing device 200 further includes a second anesthetic gas-generating means 140 mounted to the inner upper portion of the second enclosure 190 for generating gas to anesthetize the experimental object or the experimental animal.

Besides, preferably, when the experimental object 400 or the experimental animal 400 is photographed by means of the two-dimensional image photographing device 100, the beam splitter 40 is inclined by 45° with respect to the X axis by the second motor 45.

Further, preferably, when the experimental object or the experimental animal 400 fixed to the inside of the test tube 120 is photographed using the light source 10 through the engagement between the two-dimensional image photographing device 100 and the three-dimensional image photographing device 200, the beam splitter 45 is inclined by 45° with respect to the X axis by the second motor 45 and the test tube mounting stand 135 on which the test tube 120 is seated rotates at a certain angle about the Z axis by the third motor 130.

Furthermore, preferably, the experimental object or the experimental animal 400 fixed to the inside of the test tube 120 is photographed using the laser scanner 110 through the engagement between the two-dimensional image photographing device 100 and the three-dimensional image photographing device 200, the beam splitter 45 is inclined by 0° with respect to the X axis by the second motor 45 and the test tube mounting stand 135 on which the test tube 120 is seated rotates at a certain angle about the Z axis by the third motor 130.

Reference will now be made in detail to the preferred embodiment of the present invention with reference to the attached drawings.

An experimental object photographing apparatus including a three-dimensional image photographing device according to the present invention will be described hereinafter with reference to the accompanying drawings.

However, the technical sprit of the present invention is not limited by the accompanying drawings.

Figure 1:
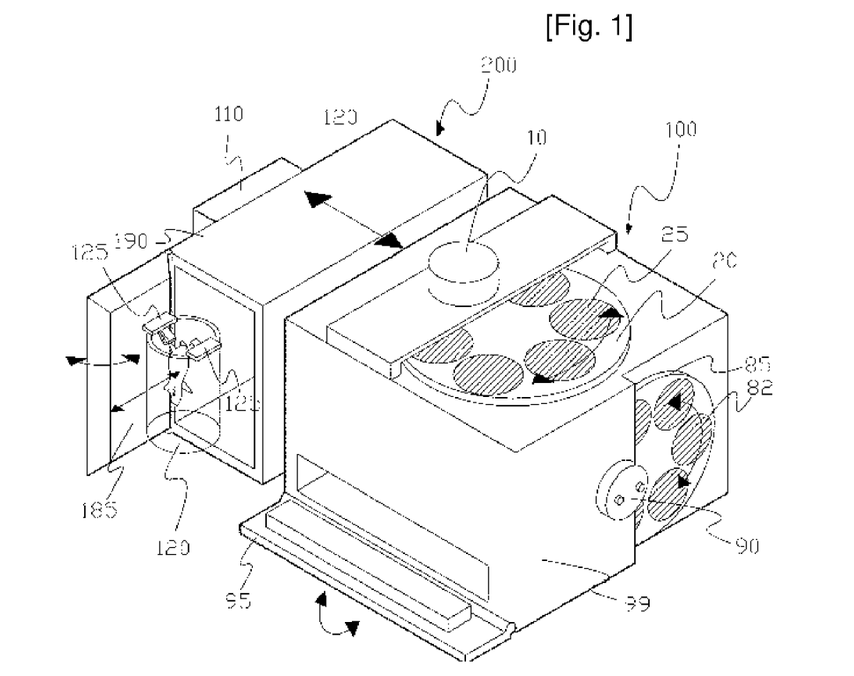
FIG. 1 is a top perspective view illustrating an experimental object photographing apparatus including a three-dimensional image photographing device according to the present invention.
Figure 2:
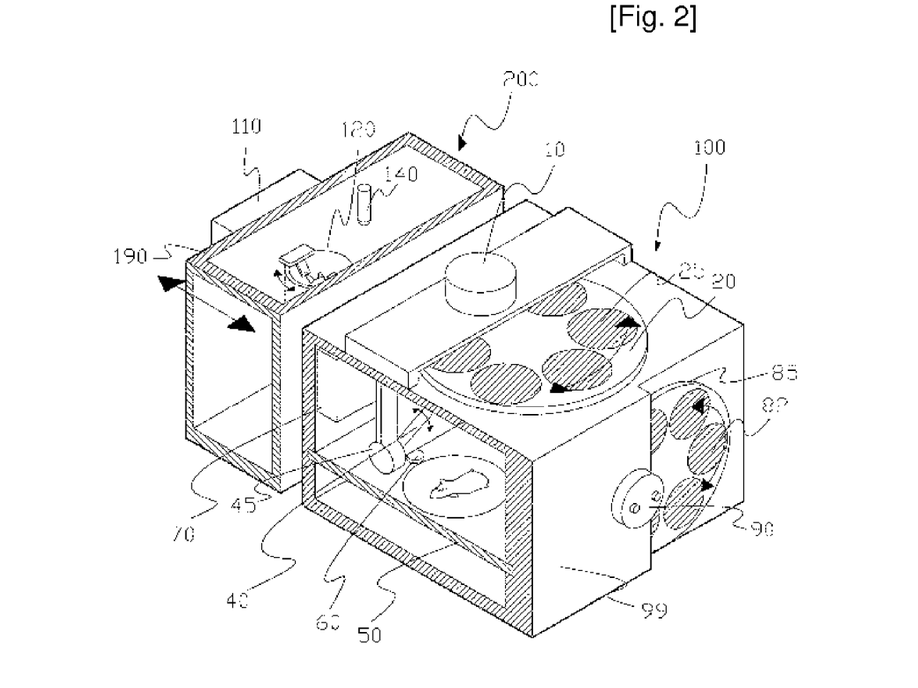
FIG. 2 is a partially cross-sectional perspective view illustrating the inside of the experimental object photographing apparatus according to the present invention.

FIG. 1 is a top perspective view illustrating an experimental object photographing apparatus including a three-dimensional image photographing device according to the present invention, and FIG. 2 is a partially cross-sectional perspective view illustrating the inside of the experimental object photographing apparatus according to the present invention.

The experimental object photographing apparatus including the three-dimensional image photographing device of the present invention comprises a two-dimensional image photographing device 100, a three-dimensional image photographing device 200, and a control section.

The two-dimensional image photographing device 100 of the experimental object photographing apparatus will be described hereinafter.

The two-dimensional image photographing device 100 of the experimental object photographing apparatus includes: a light source 10 for generating light used to photograph an experimental object or an experimental animal; a first optical filter wheel 20 mounted below the light source and having first optical filters 25 circumferentially arranged at certain angles for allowing only light of a necessary wavelength among the light generated from the light source to pass therethrough; a first motor 30 mounted at the center of the first optical filter wheel 20 for rotating the first optical filter wheel 20 about a Z axis; a beam splitter 40 mounted below the first optical filter wheel 20 for allowing the light passed through the first optical filters 25 to pass therethrough or to be reflected therefrom at a certain ratio; a second motor 45 mounted at one side end of the beam splitter 40 for rotating the beam splitter 40 about an X axis; a first window 50 mounted below the beam splitter 40 for allowing the light passed through the beam splitter 40 to be transmitted therethrough; a second window 70 mounted at the back of the beam splitter 40 for allowing the light reflected from the beam splitter 40 to be transmitted therethrough; an optical zoom module 80 mounted in front of the beam splitter 40 for magnifying or shrinking an image of the experimental object or the experimental animal 400 passed through the beam splitter 40; a second optical filter wheel 85 mounted in front of the optical zoom module 80 and having second optical filters 82 circumferentially arranged at certain angles for allowing only light of a necessary wavelength among the light reflected from the experimental object or the experimental animal 400 to pass therethrough; a fourth motor 87 mounted at the center of the second optical filter wheel 85 for rotating the second optical filter wheel 85 about an Y axis; a photographing means 90 for photographing the magnified or shrinked image of the experimental object or the experimental animal 400 passed through the optical zoom module 80 and the second optical filters 82 of the second optical filter wheel 85; and a first enclosure 99 to which the light source 10, the first optical filter wheel 20, the first motor 30, the beam splitter 40, the second motor 45, the first window 50, the second window 70, the optical zoom module 80, the second optical filter wheel 85, the fourth motor 87 and the photographing means 90 are fixedly mounted, the first enclosure having a first door(95) mounted at a lower portion of one side thereof in such a manner as to be disposed below the first window 50 so as to be openably/closeably moved downwardly/upwardly.

The two-dimensional image photographing device 100 the experimental object photographing apparatus will be described hereinafter in detail with reference to FIGS. 1 to 3.

The light source 10 is a constituent element for emitting light used to photograph an experimental object or an experimental animal, and is replaceable with any device for producing light such as a light bulb or a high-luminance LED for typically producing light by electricity. Also, the light source 10 is mounted above the two-dimensional image photographing device 100 so as to allow light to be emitted to the bottom. Only light of a necessary wavelength among the light emitted from the light source 10 passes through the first optical filters 25 and then transmits through or reflected from the beam splitter 40 to illuminate the experimental object or the experimental animal 400.

The first optical filter wheel 20 has first optical filters 25 circumferentially arranged at certain angles for allowing only light of a necessary wavelength among the light generated from the light source to pass therethrough. The first optical filters 25 of the first optical filter wheel 20 may be arranged in plural numbers, and six first optical filters 25 are arranged at 60 degree intervals. Some of the first optical filters 25 are fixed and the others may be mounted detachably. In this embodiment, for the sake of convenience in use, in case where six first optical filters 25 are mounted, four of the six first optical filters are fixed and two first optical filters are mounted detachably. In addition, the first optical filters 25 of the first optical filter wheel 20 selectively passes the light of wavelengths ranging from 400 nm to 900 nm therethrough so as to photograph an experimental result of the experimental animal. The first optical filter wheel 20 may be made of any material in which no deformation occurs such as synthetic resin or metallic material.

The first motor 30 is mounted at the center of the first optical filter wheel 20 so as to rotate the first optical filter wheel 20 about a Z axis. The first motor 30 is intended to use various kinds of the first optical filters 25 arranged in the first optical filter wheel 20. In FIG. 2, the first motor 30 is mounted at the center of the first optical filter wheel 20 to rotate the first optical filter wheel 20. The first motor 30 employs a stepping motor or a servo motor for the purpose of accurate angle control. Further, the first motor 30 is connected to the control section so that it is controlled by means of a control signal generated from the control section.

The beam splitter 40 is mounted below the first optical filter wheel 20 so as to allow the light passed through the first optical filters 25 to pass therethrough or to be reflected therefrom at a certain ratio. The beam splitter 40 allows a part of the light passed through the first optical filters 25 to pass therethrough and a part of the light passed through the first optical filters 25 to be reflected therefrom. The two-dimensional image photographing device 100 is constructed such that the light generated from the light source 10 passes through the first optical filters 25 and the beam splitter 40 and is illuminated to the experimental animal 400 placed below the beam splitter 40, and then light reflected from the experimental animal 400 is re-reflected from the beam splitter 40 to pass through the second optical filter 82 so as to photograph an image of the experimental animal 400 through the photographing means 90.

The second motor 45 is mounted at one side end of the beam splitter 40 so as to rotate the beam splitter 40 about an X axis. The second motor 45 is intended to regulate the angle of the beam splitter 40. When a three-dimensional image of the experimental animal 400 is photographed using the laser scanner 110, the angle of the beam splitter 40 is 0°, in case of excepting for the above case, the angle of the beam splitter 40 must be kept at 45°. The second motor 45 is used to regulate the angle of the beam splitter 40 in conformity with a necessary situation as described above. The second motor 45 must regulate the angle of the beam splitter 40, and hence is constructed of a servo motor or a stepping motor. In addition, the second motor 45 is connected to the control section so that it is controlled by means of a control signal generated from the control section.

The first window 50 is mounted below the beam splitter 40 so as to allow the light passed through the beam splitter 40 to be transmitted therethrough. The first window 50 functions to isolate the experimental object or the experimental animal 400 from the above-mentioned constituent elements as being disposed above a place where the experimental object or the experimental animal 400 are put i.e., below the beam splitter 40. The first window 50 is made of a transparent material for allowing light to be transmitted therethrough.

The second window 70 is mounted at the back of the beam splitter 40 so as to allow the light reflected from the beam splitter 40 to be transmitted therethrough. The second window 70 functions to isolate the experimental object or the experimental animal 400 from the above-mentioned constituent elements similarly to the first window 50 and is used to photograph a three-dimensional image of the experimental object or the experimental animal 400.

The optical zoom module 80 is mounted in front of the beam splitter 40 so as to magnify or shrink an image of the experimental object or the experimental animal 400 passed through the beam splitter 40. The optical zoom module 80 is similar to a portion for magnifying or shrinking the image of a subject in a camera and is intended to minutely photograph the image of the experimental object or the experimental animal. The optical zoom module 80 is connected to the control section so as to magnify or shrink the image the experimental object or the experimental animal in response to a control signal generated from the control section.

The second optical filter wheel 85 is mounted in front of the optical zoom module 80 and has second optical filters 82 circumferentially arranged at certain angles for allowing only light of a necessary wavelength among the light reflected from the experimental object or the experimental animal 400 to pass therethrough.

In case where six second optical filters 82 are arranged at 60 degree intervals, two first optical filters are mounted detachably. The second optical filter wheel 85 is used to obtain the image of a necessary wavelength band from the light reflected from the experimental object or the experimental animal 400. The second optical filter 82 of the second optical filter wheel 85 selectively passes the light of wavelengths ranging from 400 nm to 900 nm therethrough. The second optical filter wheel 85 may be made of any material in which no deformation occurs such as synthetic resin or metallic material.

The second optical filter wheel 85 is connected at the center thereof to the fourth motor 87 so as to rotate.

The fourth motor 87 is mounted at the center of the second optical filter wheel 85 so as to rotate the second optical filter wheel 85 about a Y axis. The fourth motor 87 is constructed of a servo motor or a stepping motor to rotate the second optical filter wheel 85 at a given angle. The fourth motor 87 is connected to the control section so that it is controlled by means of a control signal generated from the control section.

The photographing means 90 serves to photograph the magnified or shrinked image of the experimental object or the experimental animal 400 passed through the optical zoom module 80 and the second optical filters 82 of the second optical filter wheel 85. The photographing means 90, which photographs the image of the experimental object or the experimental animal 400, is constructed of a CCD- or CMOS-type image sensor. The photographed image is digitalized and is transmitted to other devices for its use.

The first enclosure 99 is configured such that the light source 10, the first optical filter wheel 20, the first motor 30, the beam splitter 40, the second motor 45, the first window 50, the second window 70, the optical zoom module 80, the second optical filter wheel 85, the fourth motor 87 and the photographing means 90 are fixedly mounted thereto. The first enclosure has the first door 95 mounted at a lower portion of one side thereof in such a manner as to be disposed below the first window 50 so as to be openably/closeably moved downwardly/upwardly.

The first enclosure 99 forms the outer appearance of the two-dimensional image photographing device 100, and may be made of any material which can take a predetermined shape such as synthetic resin or metallic material. The first door 95 of the first enclosure 99 is intended to open or close a lower portion of the first enclosure below the first window 50 where the experimental object or the experimental animal 400 is put. The first door 95 is formed at a lower portion of a side of the first enclosure 99 to have a size which can shield an opening extending from a side of the first window 50 to the lower portion of a side of the first enclosure 99. The first door 95 is mounted so as to be openably/closeably moved downwardly/upwardly for the sake of convenience in use.

In addition, the two-dimensional image photographing device 100 further includes a first anesthetic gas-generating means 60 mounted below the first window 50 for generating gas to anesthetize the experimental object or the experimental animal. The first anesthetic gas-generating means 60 may take the shape of a vessel having an anesthetic solution contained therein and the shape of an injector which can inject an anesthetic solution.

Now, the three-dimensional image photographing device 200 will be described hereinafter in detail with reference to FIGS. 1, 2, 4 and 5.

The laser scanner 110 generates a laser beam to transmit the experimental object or the experimental animal. The laser beam generated from the laser scanner 110 is used to photograph the inside of the experimental object or the experimental animal 400 since it has a property of transmitting the experimental object or the experimental animal 400. The laser scanner 110 is disposed at the back of the experimental object or the experimental animal 400 so that the experimental object or the experimental animal 400 fixed to the inside of the test tube 120 is illuminated internally.

Figure 4:
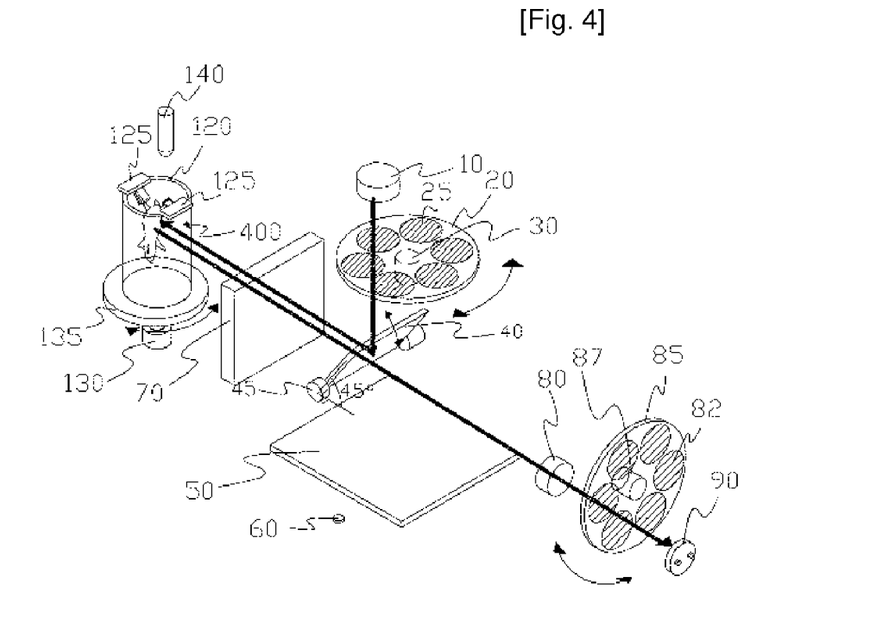
FIG. 4 is a schematic perspective view illustrating a method of photographing a three-dimensional image using a light source of the experimental object photographing apparatus according to the present invention.
Figure 5:
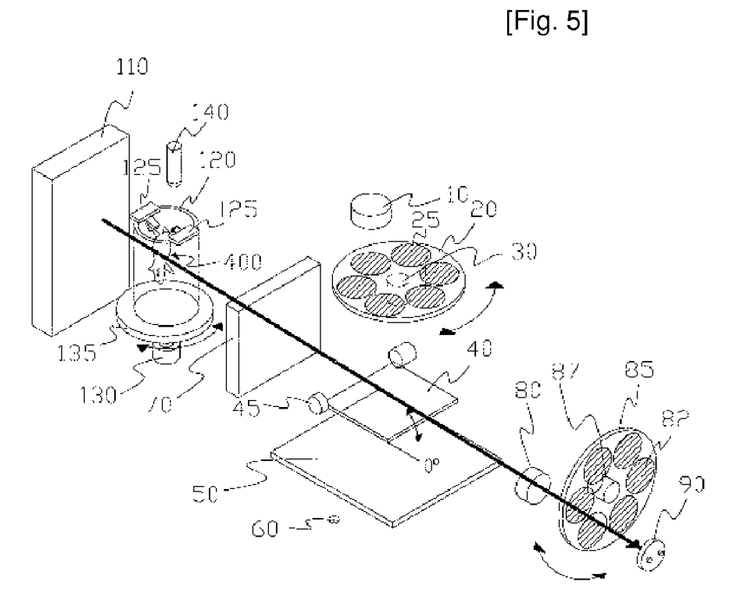
FIG. 5 is a schematic perspective view illustrating a method of photographing a three-dimensional image using a laser scanner of the experimental object photographing apparatus according to the present invention.

The test tube 120 allows light emitted from the laser scanner 110 to transmit therethrough and has a pair of fixing means 125 mounted to the upper portion thereof so as to fix the experimental object or the experimental animal. The test tube 120 is mounted to isolate the experimental objector the experimental animal 400 from the outside and fix it, and is made of a transparent material for allowing a laser beam or light to be transmitted therethrough. In FIGS. 4 and 5, there is shown a state in which the experimental animal 400 is fixed to the inside of the test tube 120. The fixing means 125 mounted to the upper end of the test tube is intended to fix the experimental objector the experimental animal 400 and may be replaceable with any member for fixing such as a clamp or a clip. The test tube 120 is disposed on the test tube mounting stand 135. The test tube 120 rotates together with the third motor 130 with it positioned on the test tube mounting stand 135.

The third motor 130 is mounted below the test tube mounting stand 135 so as to rotate the test tube 120 about the Z axis. The third motor 130 is used to rotate the test tube mounting stand 135 so as to produce a three-dimensional image of the experimental object or the experimental animal 400 received within the test tube 120 positioned on the test tube mounting stand 135. The third motor 130 is constructed of a servo motor or a stepping motor to rotate the test tube mounting stand 135 at a given angle. In addition, the third motor 130 is connected to the control section so that it is controlled by means of a control signal generated from the control section.

The test tube mounting stand 135 is fixedly mounted above the third motor 130 so as to allow the test tube 120 to be seated thereon. The test tube mounting stand 135 acts to transfer a rotary force of the third motor 130 to the test tube 120. The test tube mounting stand 135 is mounted for the purpose of facilitating insertion and withdrawal of the experimental object or the experimental animal 400 into and from the test tube 120. The test tube mounting stand 135 may be modified into any shape which can allow the test tube 120 to be placed stably thereon.

The second enclosure 190 is configured such that the laser scanner 110 is mounted to one side thereof, the test tube 120, the third motor 130 and the test tube mounting stand 135 are fixedly mounted therein. The second enclosure is detachably mounted at the other side thereof to the second window 70 of the two-dimensional image photographing device 100 and has a second door 185 openably/closeably mounted at the one side of the second enclosure.

The second enclosure 190 forms the outer appearance of the two-dimensional image photographing device 200 and is coupled to the two-dimensional image photographing device 100. Further, the second door 185 is mounted at one side of the second enclosure so as to allow the test tube 120 to be inserted or withdrawn into or from the two-dimensional image photographing device 200 therethrough.

Moreover, the three-dimensional image photographing device 200 further includes a second anesthetic gas-generating means 140 mounted to the inner upper portion of the second enclosure 190 for generating gas to anesthetize the experimental object or the experimental animal.

The second anesthetic gas-generating means 140 may take the shape of a vessel having an anesthetic solution contained therein and the shape of an injector which can inject an anesthetic solution. The second anesthetic gas-generating means 140 is used to prevent experimental animal 400 from being awakened while photographing the image of the experimental animal 400.

Figure 6:
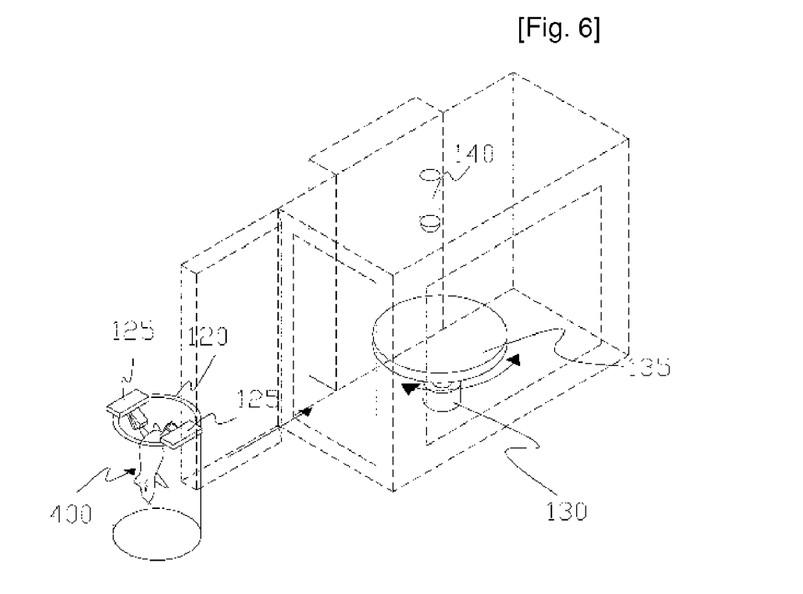
FIG. 6 is a schematic perspective view illustrating a state in which a test tube is put into the three-dimensional image photographing device of the experimental object photographing apparatus according to the present invention.

FIG. 6 shows a state in which the test tube 120 is inserted and withdrawn into and from the three-dimensional image photographing device 200.

The control section functions to control controlling the operations of the first motor 30, the second motor 45, the fourth motor 87, the optical zoom module 80, the photographing means 90 and the third motor 130, and may be a microcontroller, a CPU, a PLC, a computer, etc.

The operation of the two-dimensional image photographing device 100 which photographs a two-dimensional image of the experimental animal will be described hereinafter in detail with reference to FIG. 3.

Figure 3:
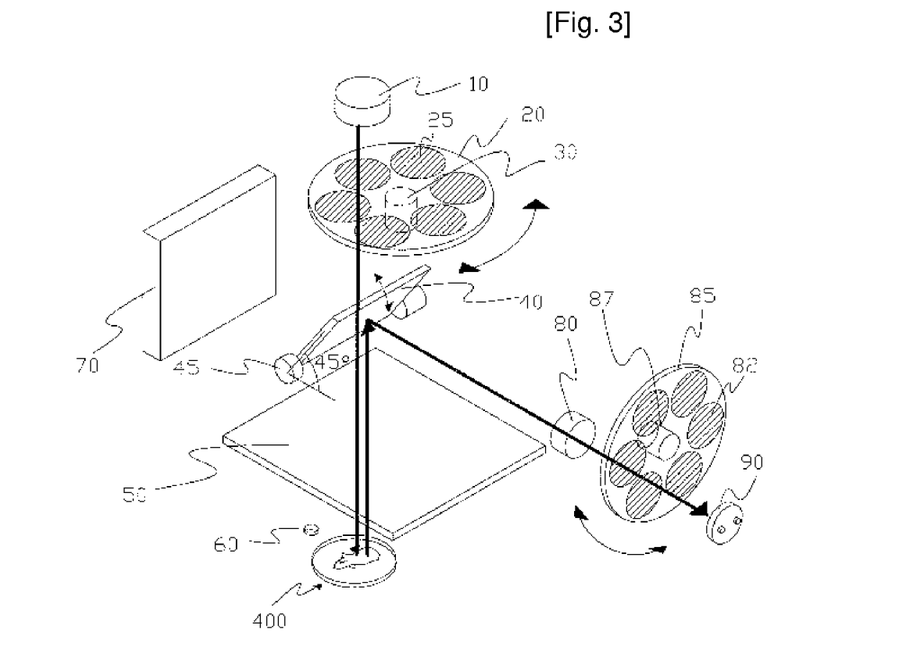
FIG. 3 is a schematic perspective view illustrating a method of photographing a two-dimensional image using a light source of the experimental object photographing apparatus according to the present invention.

In order to photograph a two-dimensional image, first as shown in FIG. 3, the beam splitter is inclined by 45° with respect to the X axis by the second motor 45. At this time, the first motor rotates so that the first optical filter 25 allowing light of a desired wavelength to be transmitted therethrough is positioned just below the light source 10. Thereafter, light generated from the light source 10 is illuminated to the experimental object or the experimental animal 400, is reflected from the beam splitter 40 and then passes through the optical zoom module 80 and a second optical filter 82 selected by rotation of the fourth motor 87 to thereby photograph an image of the experimental object or the experimental animal 400 through the photographing means 90. An arrow shown in FIG. 3 indicates the traveling path of the light generated from the light source 10.

The operation of photographing a three-dimensional image through the coupling of the three-dimensional image photographing device 200 to the two-dimensional image photographing device 100 will be described hereinafter in detail with reference to FIGS. 4 and 5.

FIG. 4 shows a process of photographing a three-dimensional image using the light generated from the light source 10.

First, the beam splitter is inclined by 45° with respect to the X axis by the second motor 45. At this time, the first motor 30 rotates so that the first optical filter 25 allowing light of a desired wavelength to be transmitted therethrough is positioned just below the light source 10. Thereafter, light generated from the light source 10 is reflected from the beam splitter 40, passes through the second window 70, and then is illuminated to and reflected from the experimental object or the experimental animal 400 fixed to inside of the test tube 120 and passes through the optical zoom module 80 and a second optical filter 82 selected by rotation of the fourth motor 87 to thereby photograph an image of the experimental object or the experimental animal 400 through the photographing means 90. At this time, the third motor 130 rotates at a certain angle interval (for example, 1° interval) and continuously photographed images are stored and edited to produce a three-dimensional image. An arrow shown in FIG. 4 indicates the traveling path of the light generated from the light source 10.

FIG. 5 shows a process of photographing a three-dimensional image using a laser beam generated from the laser scanner 110.

First, the beam splitter is inclined by 0° with respect to the X axis by the second motor 45. A laser beam generated from the laser scanner 110 is transmitted through the experimental object or the experimental animal 400 fixed to the inside of the test tube 120, is transferred to the optical zoom module 80 through the second window 70, and then passes through a second optical filter 82 selected by rotation of the fourth motor 87 to thereby photograph an image of the experimental object or the experimental animal 400 through the photographing means 90. Also, at this time, similarly to the case where a three-dimensional image photographed using the light source, the third motor 130 rotates at a certain angle interval (for example, 1° interval) and continuously photographed images are stored and edited to produce a three-dimensional image.

ADVANTAGEOUS EFFECTS

The experimental object photographing apparatus according to the present invention includes the three-dimensional experimental object photographing device detachably mounted to the two-dimensional image photographing device so as to obtain a two-dimensional image and a three-dimensional image of the experimental object. Also, since the three-dimensional image photographing device is coupled to the two-dimensional image photographing device only when it is desired to photograph the three-dimensional image, its installation and operation are easy. Further, the two-dimensional image photographing device and the three-dimensional image photographing device do not need to be purchased separately, thereby saving the cost.

EXPLANATION ON REFERENCE NUMERALS
OF MAIN ELEMENTS IN THE DRAWINGS

| | |
|---|---|
| 10: light | 20: first optical filter wheel |
| 25: first optical filter | 30: first motor |
| 40: beam splitter | 45: second motor |
| 50: first window | 60: first anesthetic gas-generating means |
| 70: second window | 80: optical zoom module |
| 82: second optical filter | 85: second optical filter wheel |
| 87: fourth motor | 90: photographing means |
| 95: first door | 99: first enclosure |
| 100: two-dimensional image photographing device | |
| 110: laser scanner | 120: test tube |
| 125: fixing means | 130: third motor |
| 135: test tube-mounting stand | |
| 140: second anesthetic gas-generating means | |
| 185: second door | 190: second enclosure |
| 200: three-dimensional image photographing device | |
| 400: experimental animal | |

BEST MODE

Embodiment 1

A Preferred Embodiment of the Present Invention

A high-luminance light bulb of 150 W and 3250° Kelvin was used as the light source in this embodiment. The first optical filter wheel has the first optical filters circumferentially arranged at 60°. The first optical filters manufactured by Korea Electro-Optics Co. Ltd., were used which allows only lights of wavelengths of 560 nm, 580 nm, 600 nm, 620 nm, 640 nm and 660 nm to pass therethrough.

And, the first motor mounted at the center of the first optical filter wheel to rotate the first optical filter wheel about the Z axis employed a Vexta motor manufactured by Oriental Motor Co., Ltd. The beam splitter, which is mounted below the first optical filter wheel and allows light passed through the first optical filter to pass therethrough or to be reflected therefrom at a ratio of 5:5, was oriented to be inclined at 45° so as to reflect light returned thereto from the experimental animal or the experimental object and employed a product manufactured by Melles Griot Inc.

The second motor mounted at one side end of the beam splitter for rotating the beam splitter about an X axis employed the same motor as the first motor. The first window allowing light passed through the beam splitter to be transmitted therethrough employed a reinforced glass made of a transparent material. The second window allowing light reflected from the beam splitter to be transmitted therethrough also employed the same material as the first window.

In addition, the optical zoom module for magnifying or shrinking an image of the experimental object or the experimental animal 400 passed through the beam splitter 40 employed a product designed and manufactured by the present applicant. The second optical filter wheel has the first optical filters circumferentially arranged at 60°. The second optical filters mounted in front of the optical zoom module was made of GFP, DsRed, Cy5.5 and ICG which allows only lights of wavelengths ranging from 515 to 575 nm, from 575 to 650 nm, from 695 to 770 nm and from 810 to 875 nm to pass therethrough.

The fourth motor mounted at the center of the second optical filter wheel 85 for rotating the second optical filter wheel 85 about a Y axis employed the same motor as the first motor.

The photographing means for photographing the image passed through the second optical filters employed a digital camera which has a function of transmitting the image to an image processing device.

And, the laser scanner of the present invention employed a product manufactured by LIMO Co., which emits a laser beam of approximately 20 mW, and the test tube used to photograph a three-dimensional image employed a tube made of a reinforced glass. A fixing clip was prepared as the fixing means for fixing the experimental object or the experimental object to the test tube. The third motor mounted below the test tube 120 for rotating the test tube 120 about the Z axis employed the same motor as the first motor.

And, the anesthetic gas-generating means included in the two-dimensional image photographing device and the three-dimensional image photographing device was adapted to generate typical gas used to anesthetize the experimental object and was operated by an external button.

Lastly, the control section of the present invention as a separate external computer employed a desk top computer connected the external device and having a window system usually used to control the first motor, the second motor, the third motor, the fourth motor, the optical zoom module and the photographing means.

MODE FOR INVENTION

Embodiment 1

A Preferred Embodiment of the Present Invention

A high-luminance light bulb of 150 W and 3250° Kelvin was used as the light source in this embodiment. The first optical filter wheel has the first optical filters circumferentially arranged at 60°. The first optical filters manufactured by Korea Electro-Optics Co. Ltd., were used which allows only lights of wavelengths of 560 nm, 580 nm, 600 nm, 620 nm, 640 nm and 660 nm to pass therethrough.

And, the first motor mounted at the center of the first optical filter wheel to rotate the first optical filter wheel about the Z axis employed a Vexta motor manufactured by Oriental Motor Co., Ltd. The beam splitter, which is mounted below the first optical filter wheel and allows light passed through the first optical filter to pass therethrough or to be reflected therefrom at a ratio of 5:5, was oriented to be inclined at 45° so as to reflect light returned thereto from the experimental animal or the experimental object and employed a product manufactured by Melles Griot Inc.

The second motor mounted at one side end of the beam splitter for rotating the beam splitter about an X axis employed the same motor as the first motor. The first window allowing light passed through the beam splitter to be transmitted therethrough employed a reinforced glass made of a transparent material. The second window allowing light reflected from the beam splitter to be transmitted therethrough also employed the same material as the first window.

In addition, the optical zoom module for magnifying or shrinking an image of the experimental object or the experimental animal 400 passed through the beam splitter 40 employed a product designed and manufactured by the present applicant. The second optical filter wheel has the first optical filters circumferentially arranged at 60°. The second optical filters mounted in front of the optical zoom module was made of GFP, DsRed, Cy5.5 and ICG which allows only lights of wavelengths ranging from 515 to 575 nm, from 575 to 650 nm, from 695 to 770 nm and from 810 to 875 nm to pass therethrough.

The fourth motor mounted at the center of the second optical filter wheel 85 for rotating the second optical filter wheel 85 about a Y axis employed the same motor as the first motor.

The photographing means for photographing the image passed through the second optical filters employed a digital camera which has a function of transmitting the image to an image processing device.

And, the laser scanner of the present invention employed a product manufactured by LIMO Co., which emits a laser beam of approximately 20 mW, and the test tube used to photograph a three-dimensional image employed a tube made of a reinforced glass. A fixing clip was prepared as the fixing means for fixing the experimental object or the experimental object to the test tube. The third motor mounted below the test tube 120 for rotating the test tube 120 about the Z axis employed the same motor as the first motor.

And, the anesthetic gas-generating means included in the two-dimensional image photographing device and the three-dimensional image photographing device was adapted to generate typical gas used to anesthetize the experimental object and was operated by an external button.

Lastly, the control section of the present invention as a separate external computer employed a desk top computer connected the external device and having a window system usually used to control the first motor, the second motor, the third motor, the fourth motor, the optical zoom module and the photographing means.

Embodiment 2

An Example of Photographing a Two-Dimensional Image of an Experimental Mouse

One experimental mouse was prepared for use in this experiment.

A small amount of an anesthetic agent was administered to the experimental mouse, the experimental mouse was placed on an experimental dish with its abdomen facing upwardly, and the experimental mouse was fixed by means of a pin or other methods so as to be prevented from being moved.

The present inventors have removed the unnecessary three-dimensional image photographing device from the experimental object photographing apparatus including the three-dimensional image photographing device when photographing the two-dimensional image and have prepared only the two-dimensional image photographing device.

First, a transparent experimental dish, on which the anatomized mouse is put, is positioned in the two-dimensional image photographing device, and the light source of the present invention was operated to emit light which is in turn illuminated to the experimental dish. At the same time, the first motor was rotated so that the first optical filters are positioned below the light source. The light source of the present invention used a high-luminance light bulb. Then, the beam splitter was adjusted in angle to be inclined by 45°.

The image of the anatomized mouse reflected from the beam splitter passes through the optical zoom module and then the second optical filter selected by rotation of the fourth motor to thereby photograph a two-dimensional image of the anatomized mouse through the photographing means.

The photographing means used a digital camera which can transmit the two-dimensional image of the anatomized mouse to an image processing device.

Embodiment 3

An Example of Photographing a Three-Dimensional Image of an Experimental Mouse Using the Light Source One experimental mouse was prepared for use in this experiment and a small amount of an anesthetic agent was administered to the experimental mouse.

The present inventors have prepared the experimental object photographing apparatus including the three-dimensional image photographing device at a state in which the three-dimensional image photographing device is coupled to the two-dimensional image photographing device when photographing the three-dimensional image.

First, the experimental mouse's hind legs were fixedly hung from the upper end of the test tube by means of and experimental clamp. Then, the test tube suspended with the experimental mouse was placed on the test tube mounting stand inside the three-dimensional image photographing device. At this time, the anesthetic state of the experimental mouse has become shallow rapidly unexpectedly, and hence the experimental mouse was again anesthetized with anesthetic gas generated from the second anesthetic gas-generating means included in the three-dimensional image photographing device. The beam splitter was regulated in angle to be inclined by 45° and a high-luminance light bulb was used as the light source.

The light emitted from the light source passed through the first optical filter selected by rotation of the first motor, was reflected from the beam splitter, and was transmitted through the second window so as to be illuminated to the experimental mouse as the experimental object of the present invention.

The image of the experimental mouse was transmitted through the second window, the beam splitter and the optical zoom module, and then was passed through the second optical filter selected by rotation of the fourth motor to thereby photograph the three-dimensional image of the experimental mouse through the photographing means.

The photographing means used a digital camera which can transmit the three-dimensional image of the experimental mouse to an image processing device.

And, the fourth motor was rotated at an angular speed of 5° per second and continuously photographed images are transferred to the image processing device so as to store and edit the continuously photographed images to thereby produce a three-dimensional image.

Embodiment 4

An Example of Photographing a Three-Dimensional Image of an Experimental Mouse Using the Laser Scanner One experimental mouse was prepared for use in this experiment and a small amount of an anesthetic agent was administered to the experimental mouse.

The present inventors have prepared the experimental object photographing apparatus including the three-dimensional image photographing device at a state in which the three-dimensional image photographing device is coupled to the two-dimensional image photographing device when photographing the three-dimensional image.

First, the experimental mouse's hind legs were fixedly hung from the upper end of the test tube by means of and experimental clamp. Then, the test tube suspended with the experimental mouse was placed on the test tube mounting stand inside the three-dimensional image photographing device. The beam splitter was regulated in angle to be inclined by 0° with respect to the X axis by the second motor. A laser beam was generated by operating the laser scanner mounted to the three-dimensional image photographing device.

The laser beam was sequentially transmitted through the experimental mouse, the second window and the optical zoom module, and then passed through the second optical filter selected by rotation of the fourth motor to thereby photograph the three-dimensional image of the experimental mouse transmitted by the laser beam through the photographing means.

The photographing means used a digital camera which can transmit the three-dimensional image of the experimental mouse to an image processing device.

And, the fourth motor was rotated at an angular speed of 5° per second and continuously photographed images are transferred to the image processing device so as to store and edit the continuously photographed images to thereby produce a three-dimensional image.

INDUSTRIAL APPLICABILITY

In terms of the characteristics of a bio-industry, a lot of experimental animals are utilized and an experimental object photographing apparatus as a measurement means of the experimental data of the experimental animals is required. Especially, the experimental object photographing apparatus is most preferably needed which facilitates the photographing of a two-dimensional or three-dimensional image and saves the cost.

The inventive experimental object photographing apparatus includes the three-dimensional experimental object photographing device detachably mounted to the two-dimensional image photographing device so as to obtain both a two-dimensional image and a three-dimensional image of the experimental object. Since the three-dimensional image photographing device is coupled to the two-dimensional image photographing device only when it is desired to photograph the three-dimensional image, its installation and operation are easy and the two-dimensional image photographing device and the three-dimensional image photographing device do not need to be purchased separately, thereby saving the cost.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An apparatus for photographing an experimental object or an experimental animal, comprising:
    a two-dimensional image photographing device 100 which includes
    a light source 10 for generating light used to photograph the experimental object or the experimental animal,
    a first optical filter wheel 20 mounted below the light source and having a plurality of first optical filters 25 circumferentially arranged at certain angles for allowing only light of a necessary wavelength among the light generated from the light source to pass therethrough,
    a first motor 30 mounted at the center of the first optical filter wheel 20 for rotating the first optical filter wheel 20 about a Z axis,
    a beam splitter 40 mounted below the first optical filter wheel 20 for allowing the light passed through the first optical filters 25 to pass therethrough or to be reflected therefrom at a certain ratio,
    a second motor 45 mounted at one side end of the beam splitter 40 for rotating the beam splitter 40 about an X axis,
    a first window 50 mounted below the beam splitter 40 for allowing the light passed through the beam splitter 40 to be transmitted therethrough,
    a second window 70 mounted at the back of the beam splitter 40 for allowing the light reflected from the beam splitter 40 to be transmitted therethrough,
    an optical zoom module 80 mounted in front of the beam splitter 40 for magnifying or shrinking an image of the experimental object or the experimental animal 400 passed through the beam splitter 40,
    a second optical filter wheel 85 mounted in front of the optical zoom module 80 and having a plurality of second optical filters 82 circumferentially arranged at certain angles for allowing only light of a necessary wavelength among the light reflected from the experimental object or the experimental animal 400 to pass therethrough,
    a fourth motor 87 mounted at the center of the second optical filter wheel 85 for rotating the second optical filter wheel 85 about an Y axis,
    a photographing means 90) for photographing the magnified or shrinked image of the experimental object or the experimental animal 400 passed through the optical zoom module 80 and the second optical filters 82 of the second optical filter wheel 85, and
    a first enclosure 99 to which the light source 10, the first optical filter wheel 20, the first motor 30, the beam splitter 40, the second motor 45, the first window 50, the second window 70, the optical zoom module 80, the second optical filter wheel 85, the fourth motor 87 and the photographing means 90 are fixedly mounted, the first enclosure having a first door(95) mounted at a lower portion of one side thereof in such a manner as to be disposed below the first window 50 so as to be openably/closeably moved downwardly/upwardly;
    a three-dimensional image photographing device 200 which includes
    a laser scanner 110 for generating a laser beam to transmit the experimental object or the experimental animal 40,
    a test tube 120 for allowing light emitted from the laser scanner 110 to transmit therethrough, the test tube having at least one fixing means 125 mounted to the upper portion thereof for fixing the experimental object or the experimental animal,
    a third motor 130 mounted below the test tube 120 for rotating the test tube 120 about the Z axis,
    a test tube mounting stand 135 fixedly mounted above the third motor 130 for allowing the test tube 120 to be seated thereon, and
    a second enclosure 190 to one side of which the laser scanner 110 is mounted, and to which the test tube 120, the third motor 130 and the test tube mounting stand 135 are fixedly mounted internally, the second enclosure being detachably mounted at the other side thereof to the second window 70 of the two-dimensional image photographing device 100 and having a second door 185 openably/closeably mounted at the one side of the second enclosure; and
    a control section for controlling the operations of the first motor 30, the second motor 45, the optical zoom module 80, the fourth motor 87, the photographing means 90 and the third motor 130.

2. The apparatus according to claim 1, wherein the plurality of first optical filter 25 of the first optical filter wheel 20 and the plurality of second optical filter 82 of the second optical filter wheel 85 are circumferentially arranged at 60 degree intervals, respectively, and two of them are replaceable.

3. The apparatus according to claim 1, wherein the two-dimensional image photographing device 100 further includes a first anesthetic gas-generating means 60 mounted below the first window 50 for generating gas to anesthetize the experimental object or the experimental animal.

4. The apparatus according to claim 1, wherein the three-dimensional image photographing device 200 further includes a second anesthetic gas-generating means 140 mounted to the inner upper portion of the second enclosure 190 for generating gas to anesthetize the experimental object or the experimental animal.

5. The apparatus according to claim 1, wherein when the experimental object 400 or the experimental animal 400 is photographed by means of the two-dimensional image photographing device 100, the beam splitter 40 is inclined by 45° with respect to the X axis by the second motor 45.

6. The apparatus according to claim 1, wherein when the experimental object or the experimental animal 400 fixed to the inside of the test tube 120 is photographed using the light source 10 through the engagement between the two-dimensional image photographing device 100 and the three-dimensional image photographing device 200, the beam splitter 45 is inclined by 45° with respect to the X axis by the second motor 45 and the test tube mounting stand 135 on which the test tube 120 is seated rotates at a certain angle about the Z axis by the third motor 130.

7. The apparatus according to claim 1, wherein the experimental object or the experimental animal 400 fixed to the inside of the test tube 120 is photographed using the laser scanner 110 through the engagement between the two-dimensional image photographing device 100 and the three-dimensional image photographing device 200, the beam splitter 45 is inclined by 0° with respect to the X axis by the second motor 45 and the test tube mounting stand 135 on which the test tube 120 is seated rotates at a certain angle about the Z axis by the third motor 130.

* * * * *